United States Patent [19]

Nahrwold

[11] Patent Number: 4,955,279
[45] Date of Patent: Sep. 11, 1990

[54] APPARATUS FOR SETTING A PROJECTILE TIME FUZE

[75] Inventor: Klaus H. Nahrwold, Hermannsburg, Fed. Rep. of Germany

[73] Assignee: Rheinmetall GmbH, Düsseldorf, Fed. Rep. of Germany

[21] Appl. No.: 404,524

[22] Filed: Sep. 8, 1989

[30] Foreign Application Priority Data

Sep. 8, 1988 [DE] Fed. Rep. of Germany ....... 3830518

[51] Int. Cl.$^5$ ............................................. F42C 17/00
[52] U.S. Cl. ........................................................ 89/6.5
[58] Field of Search ........................................... 89/6.5

[56] References Cited

U.S. PATENT DOCUMENTS

| | | | |
|---|---|---|---|
| 4,022,102 | 5/1977 | Ettel | 89/6.5 |
| 4,080,869 | 3/1978 | Karayannis | 89/6.5 |
| 4,283,989 | 8/1981 | Toulios et al. | 89/6.5 |
| 4,649,796 | 3/1987 | Schmidt | 89/6.5 |
| 4,664,013 | 5/1987 | Wegner et al. | 89/6.5 |
| 4,862,785 | 9/1989 | Ettel et al. | 89/6.5 |

FOREIGN PATENT DOCUMENTS 2023938 11/1971 Fed. Rep. of Germany .
3404011 8/1985 Fed. Rep. of Germany .
2034011 5/1980 United Kingdom .

OTHER PUBLICATIONS

Erich Pehl, *Mikrowellentechnik*, (Dr. Alfred Hüthig Verlag Heidelberg), vol. 1, pp. 188-189.

*Primary Examiner*—David H. Brown
*Attorney, Agent, or Firm*—Spencer & Frank

[57] ABSTRACT

An apparatus for setting a time fuse in a projectile, with the muzzle velocity of the projectile being measured and its delay being corrected by the value measured for the muzzle velocity. To determine the muzzle velocity of the projectile, the latter is provided with a magnetic field sensor and the gun barrel is provided with two magnetic axially spaced field generators adjacent its muzzle. The magnetic field sensor is connected, via an amplifier, to a start/stop counter which starts counting clock pulses when the projectile flies past a first of the magnetic field generators and stops counting clock pulses when the projectile flies past the other of the two magnetic field generators to provide a final count which is a measure of the projectile muzzle velocity. The final count of the start/stop counter is then used to adjust the counter clock pulse frequency which is then used by further circuitry, e.g. a preset backward counter, to provide the delay for the fuze.

14 Claims, 3 Drawing Sheets

APPARATUS FOR SETTING A PROJECTILE TIME FUZE

BACKGROUND OF THE INVENTION

The present invention relates to an apparatus for setting the delay of a time fuze of a projectile fixed from a tubular weapon or gun barrel wherein the muzzle velocity of the projectile is measured and the delay is corrected by the value measured for the muzzle velocity. More particularly, the present invention relates to such an apparatus wherein the gun barrel is provided with a magnetic field generator adjacent its muzzle and the projectile is provided with a magnetic field sensor for detecting the magnetic field in order to measure the muzzle velocity of the projectile.

Such devices are disclosed, for example, in DE-AS No. 2,605,374, corresponding to U.S. Pat. No. 4,022,102, issued May 10th, 1977. In this prior art device, a pulse is actuated with the aid of a triggering coil disposed in the gun barrel when the projectile passes through this coil. This pulse is fed to a process computer and, upon passage of the projectile, gives a signal to the computer to calculate the required information and forward it to a transmitter which then, via a transmitting coil on the gun barrel, transmits the information to the fuze disposed in the projectile, via a receiving coil mounted on the projectile, when the projectile passes through the transmitting coil. The primary drawback in this prior art arrangement is the relatively great circuitry expenditures for the process computer and the transmitter.

Furthermore, DE No. 3,307,785.A1 , corresponding to U.S. Pat. No. 4,664,013, issued May 12th, 1987, discloses a method and an apparatus for setting a projectile fuze in which the velocity of the projectile is measured in that the receiving sensor disposed in the projectile flies past two annular grooves formed in the inner surface of the gun barrel.

This detunes an oscillator which furnishes measurement pulses to determine the muzzle velocity. By employing the principle of a forward-backward counter in the fuze or detonator, the detonator can be provided with a clock pulse generator meeting limited stability requirements. The primary drawback of this prior art arrangement is the relatively inaccurate velocity measurement because the maximum frequency of the clock pulse generator is 50 MHz and thus the time resolution is only 20 ns. Moreover, the sensor emits high frequency waves so that the projectile can be located by enemy radar.

Finally, DE No. 3,404,011.A1, laid-open on Aug. 8th, 1985, discloses an arrangement with which the velocity of a projectile is measured in that two annular grooves are provided in the wall of the gun barrel to serve as the measuring base for a microwave transmit-receive device. The transmit-receive device is here accommodated in the tip of the projectile where the evaluation is also made. This prior art device also has the drawback, inter alia, that an active sensor is employed which can be located by radar.

SUMMARY OF THE INVENTION

It is therefore an object of the present invention to improve a device of the above-mentioned type in such a way that the projectile velocity can be determined very accurately with relatively low expenditures for apparatus. Preferably, the order of magnitude of the accuracy should be 0.1 to 0.2 permill.

This object is accomplished according to the invention by an apparatus for setting a time fuze in a projectile after firing from a gun barrel which comprises: first and second magnetic field generators disposed in the gun barrel adjacent its muzzle and at a known axial distance from one another; magnetic field sensor means, mounted on the projectile, for sensing the respective magnetic fields generated by the first and second magnetic field generators as the projectile passes same after firing and for producing respective first and second output pulses; and circuit means, disposed in the projectile and responsive to the first and second output pulses, for correcting the fuze time setting in accordance with the muzzle velocity of the projectile; and wherein the circuit means includes a source of clock pulses, a start/stop counter means, connected to the magnetic field sensor means via an amplifier, for beginning counting of clock pulses from the clock pulse source upon receipt of the first output pulse and for stopping counting of the clock pulses upon receipt of the second output pulse to provide a final count which is a measure of the muzzle velocity of the projectile, and further circuit means, responsive to the final count in the start/stop counter means, for correcting the time fuze setting.

The invention is thus essentially based on the idea that great measuring accuracy is realized in that, on the one hand, two spaced magnetic field generators are employed in the gun barrel and, on the other hand, the projectile velocity is not determined in a process computer but in a relatively simple circuit within the projectile itself.

Further details and advantages of the invention will become evident from embodiments which will be described in greater detail below with reference to the drawing figures.

DETAILED DESCRIPTION OF THE PREFERRED EMBODIMENT

Figure 1:
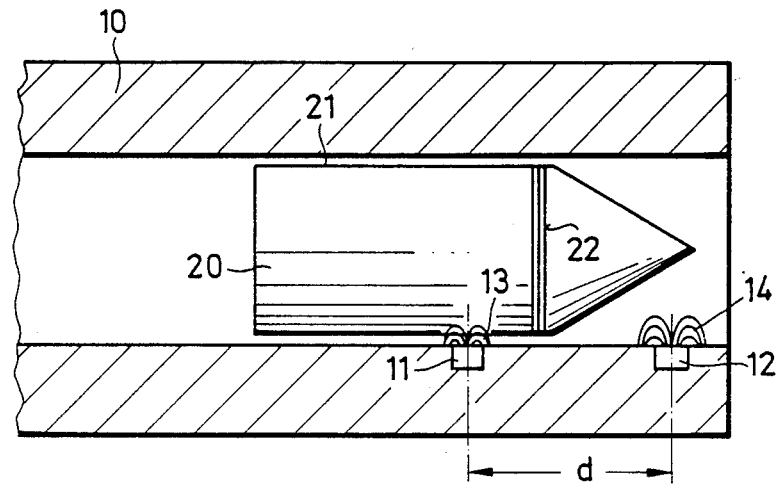
FIG. 1 is a schematic representation of the arrangement of a gun barrel and a projectile according to the invention.

Referring now to FIG. 1, there is shown the muzzle portion of a gun barrel 10 through which a projectile 20 passes after it is fired. Inserted in the wall of gun barrel 10 adjacent the muzzle are two magnetic field generators 11 and 12 for generating defined magnetic fields 13 and 14 in the interior of the gun barrel 10. The magnetic field generators 11 and 12 are disposed at a known axial distance d which determines the measuring base and which is, for example, about 100 mm.

The body 21 of the projectile 20 is provided with a rotationally symmetrical magnetic field sensor 22 which generates a respective voltage pulse during each passage of the sensor 22 through a respective magnetic field 13 or 14. The time difference between the two voltage pulses is a measure for the muzzle velocity of the projectile 20.

Figure 2:
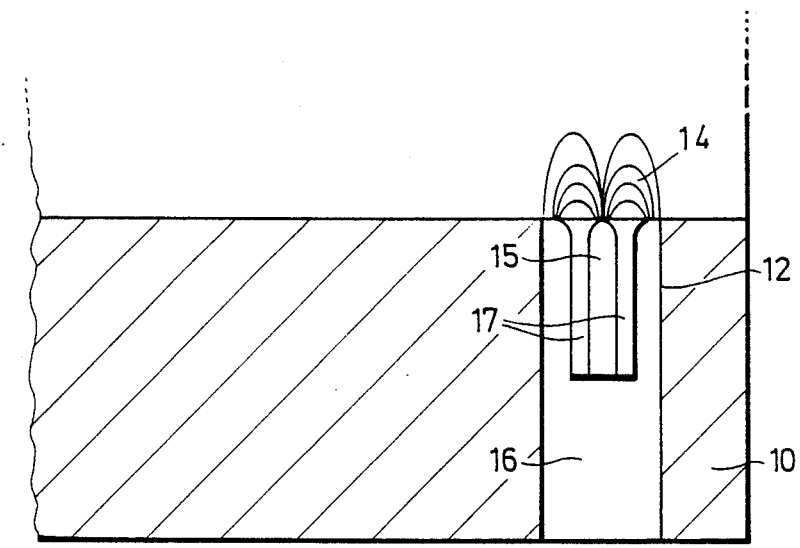
FIG. 2 is a schematic sectional view of a preferred embodiment of a magnetic field generator according to a feature of the invention.

FIG. 2 shows a possible embodiment of a magnetic field generator 11 or 12. The generator 12 shown in FIG. 2 include a substantially temperature and shock resistant permanent magnet 15 disposed in a holder 16 of a magnetically soft material. e.g. iron. The holder 16 is preferably rotationally symmetrical, i.e., rod shaped, and is provided with an axial blind bore at one end in which the magnet 15 is axially disposed so that it rests on the inner radial surface of the holder 16 defining the bottom surface of the bore. The portion of the bore between the permanent magnet 15 and the inner side wall of the holder 16 is filled with a material 17 which magnetically insulates permanent magnet 15 against holder 16. The magnetic insulating material 17 employed is, for example, brass, while the permanent magnet 15 is formed of a material which retains its magnetism even at high temperatures, for example of a material sold under the product name of Ticonam by Peter Welter GmbH & Co.

Although as shown in FIG. 1, the magnetic field generators 11 and 12 may simply be inserted into the inner surface of the barrel 10, preferably as shown in FIG. 2 the holder 16 is inserted in a small radial through bore provided in the gun barrel 10 and fastened therein, e.g. via a screw thread. Moreover as further shown in FIG. 2, at the inner surface of the gun barrel 10, the end of the permanent magnet 15 and the inner edge of the holder 16 are rounded, e.g., parabolically. This measure makes the magnetic fields more homogeneous and they extend further into the interior of the gun barrel 10. With a suitable magnetic field sensor 22 and the appropriate electronic evaluation system for the timed fuze disposed in the projectile 30, it is possible to measure the center axis of magnetic field generator 11 or 12 very accurately.

Instead of permanent magnet 15, an electromagnet can also be employed as the magnetic field generator 11 or 12.

Figure 3:
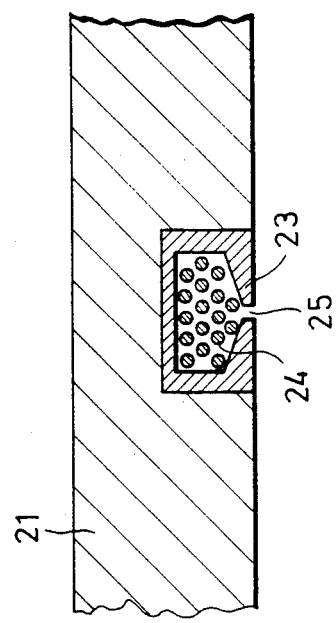
FIG. 3 is a schematic cross-sectional view of a preferred embodiment of a magnetic field sensor according to a further feature of the invention.

FIG. 3 is a sectional view of the mechanical structure of the magnetic field sensor 22. The magnetic field sensor 22 includes a coil 24 which is circumferentially disposed in the surface of the projectile body 21, preferably, as shown, adjacent the front end of the full caliber portion of the projectile. In order to obtain the best possible spatial resolution, the coil 24 is surrounded by an annular hollow member 23 of soft magnetic material, e.g., iron, which is disposed at the surface of the projectile body and guides the magnetic fields around the coil 24 in a defined manner. On its exterior surface, the member 23 of the magnetic field sensor 22 is provided with a circumferential slot 25 of a width of about 0.1 mm. The spatial resolution is then below 0.1 mm.

Figure 4:
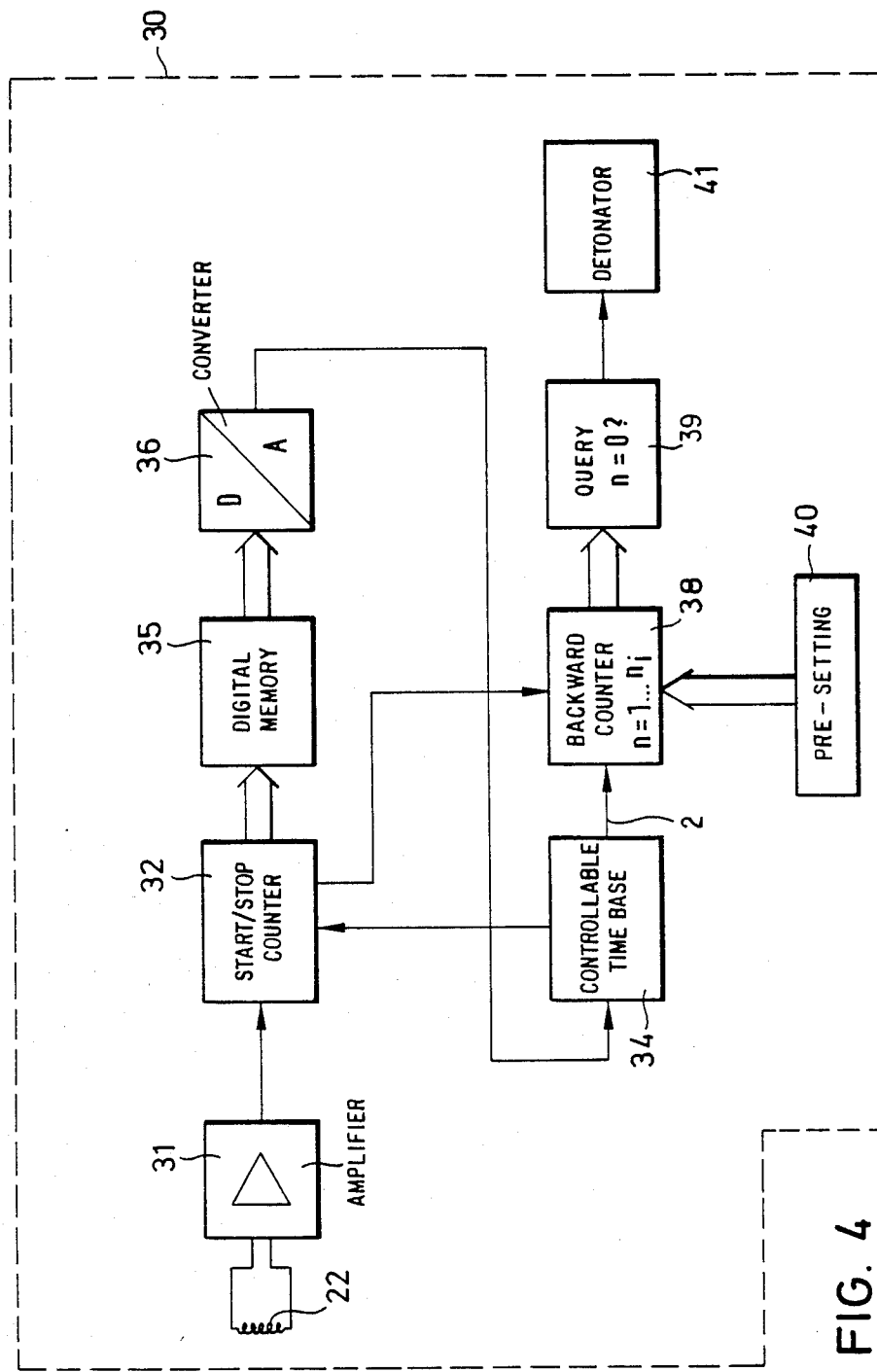
FIG. 4 is a block circuit diagram according to the invention for actuating projectile detonator.

The electronic system for processing the signals furnished by magnetic field sensor 22 is shown schematically in FIG. 4 and will be described in greater detail below.

The magnetic field sensor 22 is connected with a start/stop counter 32 via an amplifier 31. With the first pulse furnished by magnetic field sensor 22, i.e., when the sensor 22 passes magnetic field generator 11 of FIG. 1, the start/stop counter 32 begins counting the clock pulses (counting pulse train 1) furnished by a controllable time base 34, e.g., the series connection of a voltage controlled oscillator and a frequency divider. The clock pulse interval time of the counting pulses provided by the time base 34 to counter 32 should lie in an order of magnitude of 10 ns so as to provide sufficient time resolution even for small measuring bases.

Counting of the clock pulses of pulse train 1 by the start/stop counter 32 is stopped by the second pulse furnished by magnetic field sensor 22, i.e., when the sensor 22 passes the magnetic field generator 12 of FIG. 1. At the same time, the final count in counter 32, which is a measure of the muzzle velocity of the projectile 20, is transmitted to a digital memory 35, e.g. a RAM, where the final count serves as an address.

In the digital memory 35, respective control voltage values are stored at respective addresses corresponding to the final count of counter 32. Upon being addressed by the final count of counter 32, the control voltage value stored in the associated address of digital memory 35 is read out and is fed via a digital/analog converter 36 to the controllable time base 34 which has an output connected to the input of a simple backward counter 38. The control voltage provided by converter 36 detunes the time base 34 (to produce a clock pulse train 2) in such a way that the delay of the detonator or time fuze 41 is adapted to the real muzzle velocity of the projectile 20. That means, if the muzzle velocity is less than expected, the clock pulse interval time of the clock pulse train 2 provided by time base 34 is extended accordingly. If the muzzle velocity is greater than expected, the clock pulse interval time of clock pulse train 2 becomes shorter. Depending on the velocity of projectile 20, the clock pulse interval time of counting clock pulse train 2 provided by the time base 34 in response to a control voltage from converter 36 lies in an order of magnitude between 10 and 100 $\mu$s. The clock pulse interval times of the counting pulse train 1 fed to counter 32 and of the counting pulse train 2 fed to backward counter 38 must meet very high demands for accuracy. They must be kept constant within a tolerance of at least 0.1%. This can be realized only with a time base constructed in microwave technology. A corresponding circuit will be described below.

The backward counter 38 is preset to a desired value by means of a device 40, e.g., a code counter, to a desired value according to the projectile type and an average muzzle velocity. The backward counter 38 is responsive to the second pulse furnished by the magnetic field sensor 22, and received via the line 37, to begin counting down the pulses of counting pulse train 2 received from the controllable time base 34.

When the backwards counter 38 reaches a predetermined count, preferably 0, as indicated, query circuit 39 generates an output pulse which is fed to the detonator 41 to cause detonation to take place.

The advantages of the described device are, in particular:

(a) No major modifications need be made to the weapon. The magnetic field generators II and 12 can be screwed into a threaded bore having, e.g., a 10 mm fine thread.

(b) The magnetic field sensor 22 is rotationally symmetrical. Therefore, the projectile 20 can be loaded in any position and can be employed for weapons having smooth barrels as well as for spin stabilized projectiles.

(c) The magnetic field sensor 22 is very small (about 3 mm deep and 3 mm wide). Therefore, it can easily be worked into the projectile housing itself or into a propelling cage for the projectile.

(d) By employing a time base produced in microwave technology, very high accuracy is ensured over the entire temperature range from about −40° C. to about +60° C.

(e) The detonation delay begins exactly at the moment when the magnetic field sensor 22 passes the second magnetic field generator 12.

A particularly advantageous embodiment for a firing resistant, highly accurate time base constructed in microwave technology will now be described.

Figure 5:
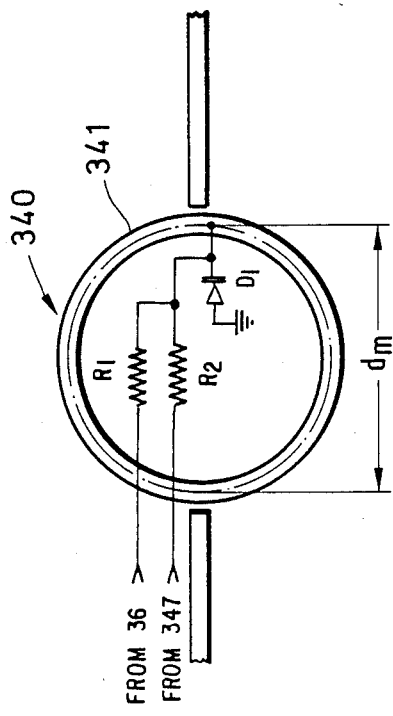
FIG. 5 is a schematic illustration of an embodiment of a ring resonator for the oscillator circuit of FIG. 4.

FIG. 5 shows the frequency determining portion of the controllable time base 34 (FIG. 4), i.e., a so-called ring resonator type microwave oscillator 340 in a stripline (including microstripline) technology. The ring resonator is essentially composed of an annular copper conductor 341 which is disposed on one surface of a dielectric circuit board of insulation material having a ground plane or conductor on its other surface, and whose average diameter $d_m$ determines the resonant frequency. Because of its mechanical structure, this ring resonator cannot be detuned or destroyed by extremely high acceleration. The remaining components of the oscillator 340 of the controllable time base 34 (transistors, resistors, capacitors, etc.) are soldered to the circuit board (not shown) and encased in epoxy resin, also in a manner which resists the stress of firing. Such microwave oscillators are known per se so that their operation need not be discussed in detail. A ring resonator circuit in microstrip technology is shown and described, for example, in the book by E. Pehl, *Mikrowellen Technik*, (Dr. Alfred Hüthig Verlag—Heidelberg) Vol. 1, pages 188–189.

As shown in FIG. 5, the control voltage for the ring resonator supplied by the D/A converter 36 (FIG. 4) is fed to the ring resonator via a resistor $R_1$ and across a diode $D_1$ connected between the conductor 341 and ground, i.e., the ground plane. Temperature compensation for the oscillator may be provided, in a manner to be described below with respect to FIG. 6, by a further control voltage fed to the conductor 341 via a resistor $R_2$.

The oscillator should be followed by a separating amplifier so that changes in loads in subsequent circuits cannot affect the oscillator. This task can be performed, for example, by a frequency divider connected to the output of the oscillator.

However, the greatest influence on the oscillator frequency is the temperature. The electrical data of all components of oscillator 340 are temperature dependent. Their influence could be kept low by stabilizing the operating temperature. But this would require a constant power to cool or heat the oscillator depending on the ambient temperature. In a projectile, such temperature stabilization is impossible or possible only with difficulty. The use of the known "digital compensation" is more appropriate.

Figure 6:
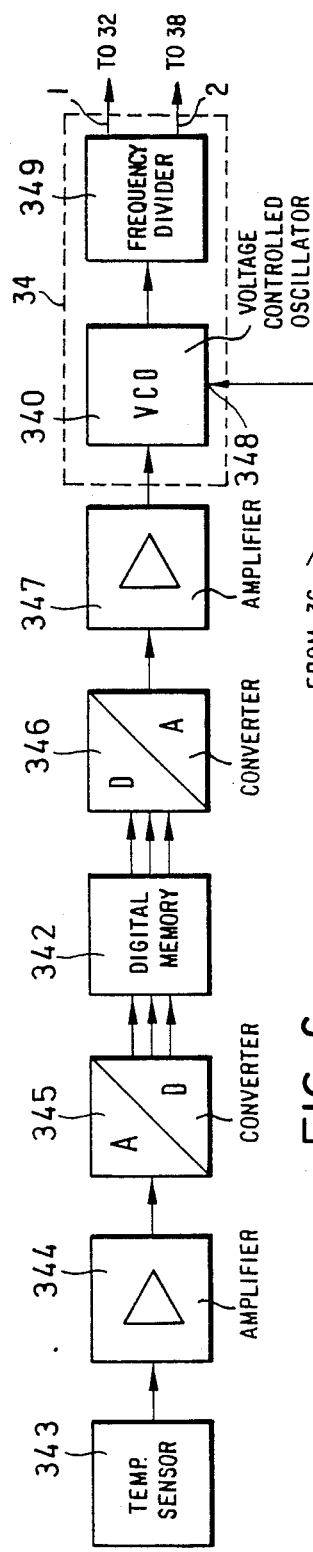
FIG. 6 is a block circuit diagram of a temperature compensating circuit for the controllable oscillator for the circuit arrangement according to FIG. 4.

FIG. 6 shows a microwave oscillator 340 operating with digital compensation to provide temperature stabilization. The circuit operates according to the following principle.

The temperature of the oscillator 340 is measured over the entire operating temperature range and control voltages which bring the oscillator 340 back to its desired frequency for respective temperatures are determined. These control voltages are digitally stored at respective addresses in a digital memory 342 in a manner known in the art (see, for example, Rainer Unverdross "Digital temperaturkompensierte Quarzoszillatoren" Digitally Temperature Compensated Quartz Oscillators, Electronik Industrie, Vol. 4, 1988, page 89, et seq.).

After firing of the projectile, the temperature of the oscillator 340 is measured by means of a temperature sensor 343 and is converted to a proportional voltage. This proportional voltage is amplified in an amplifier 344 and converted, in an analog/digital converter 345, into a digital number corresponding to the temperature. This digital number is the address in memory 342 under which the respective control voltage for the measured temperature is digitally stored. A digital/analog converter 346 reconverts the stored digital signal which is addressed and read out of memory 342 into a corresponding analog control voltage. This control voltage is fed to a control input of oscillator 340 via an amplifier 347 to temperature stabilize the oscillator. Via a second control input 348 of oscillator 340, the frequency of the oscillator 340 can be varied in order to provide compensation for any fluctuations in measured muzzle velocities as described above.

The digital compensation has the particular advantage that temperature dependent changes of all components present in the microwave oscillator are considered and thus compensated. If a conventional digital memory having 256 memory locations and a word length of eight bits is employed for the memory 346, and if one covers a temperature range of 100° C., the resolution is less than 0.4° C. That means that in a temperature range from, for example, −40° to +60° C., the desired oscillator frequency is detuned only to the extent it would occur for a temperature fluctuation of 0.4° C. The accuracy of the time base over the entire temperature range lies below 0.1 permill.

The invention now being fully described, it will be apparent to one of ordinary skill in the art that any changes and modifications can be made thereto without departing from the spirit or scope of the invention as set forth herein.

What is claimed is:

1. Apparatus for setting a time fuze in a projectile after firing from a gun barrel comprising: first and second magnetic field generators disposed in said gun barrel adjacent its muzzle and at a known axial distance from one another; magnetic field sensor means, mounted on the projectile, for sensing the respective magnetic fields generated by said first and second magnetic field generators as the projectile passes same after firing and for producing respective first and second output pulses; and circuit means, disposed in said projectile and responsive to said first and second output pulses, for correcting the fuze time setting in accordance with the muzzle velocity of the projectile; and wherein said circuit means includes a source of clock pulses, a start/stop counter means, connected to said magnetic field sensor means via an amplifier, for beginning counting of clock pulses from said clock pulse source upon receipt of said first output pulse and for stopping counting of said clock pulses upon receipt of said second output pulse to provide a final count which is a measure of the muzzle velocity of the projectile, and further circuit means, responsive to the final count in said start/stop counter means, for correcting the time fuze setting.

2. Apparatus as defined in claim 1 wherein said magnetic field sensor means includes a hollow annular sleeve of soft magnetic material circumferentially disposed on the outer surface of said projectile and provided with a circumferential slot in its exterior surface, and a coil disposed in and surrounded by said sleeve.

3. Apparatus as defined in claim 2 wherein said slot has a width of about 0.1 mm.

4. Apparatus as defined in claim 1 wherein: each of said magnetic field generators includes a holder of soft magnetic material having an axial blind bore in one end surface and a magnet axially disposed in said blind bore and radially surrounded, within said bore, by a nonmagnetic material; said magnetic field generator is radially disposed in the wall of said gun barrel with said one end surface being disposed at the inner surface of said wall of said gun barrel; and the tip of said magnet and the inner edge of said holder at said inner surface of said gun barrel are parabolically rounded.

5. Apparatus as defined in claim 2 wherein said magnet is a permanent magnet.

6. Apparatus as defined in claim 2 wherein said magnetic field sensor means includes a hollow annular sleeve of soft magnetic material circumferentially disposed on the outer surface of said projectile and provided with a circumferential slot in its exterior surface, and a coil disposed in and surrounded by said sleeve.

7. Apparatus as defined in claim 1 wherein said source of clock pulses for said start/stop counter means includes a controllable time base.

8. Apparatus as defined in claim 7 wherein said further circuit means includes: means, responsive to the final count of said start/stop counter means, for providing a control signal for said controllable time base to change the clock pulse frequency in accordance with the muzzle velocity of the projectile; a preset backward counter means for counting the changed clock pulses from said controllable time base; and means for providing a signal for activating a detonator of said time fuze when said backward counter means reaches a predetermined count.

9. Apparatus as defined in claim 8 wherein said predetermined count is zero.

10. Apparatus as defined in claim 8 wherein said backward counter means is responsive to receipt of said second output pulse of said magnetic field sensor means to begin counting of the charged clock pulses.

11. Apparatus as defined in claim 8 wherein said means responsive to the final count of said start/stop counter means comprises: a digital memory means for storing, at respective addresses, digital control voltage values for said controllable time base corresponding to respective final counts of said start/stop counter means and for producing a digital output signal corresponding to a respective stored digital control value in response to being addressed by the associated said final count from said start/stop counter means; and a digital to analog converter connected between the output of said digital memory means and a control input of said controllable time base.

12. Apparatus as defined in claim 7 wherein said controllable time base is a voltage controlled oscillator including a frequency determining unit in the form of a ring resonator constructed in a stripline technique.

13. Apparatus as defined in claim 12 further comprising circuit means for providing temperature compensation for said oscillator.

14. Apparatus as defined in claim 13 wherein said circuit means for providing temperature compensation comprises: a temperature sensor means for sensing the temperature of said oscillator circuit and for producing an output voltage proportional to the sensed temperature; a digital memory means for storing, at respective addresses, control voltage values for providing temperature compensation for said oscillator; an analog to digital converter means, connected between the output of said sensor means and an address input of said digital memory means, for causing read-out of the control voltage value corresponding to the output voltage of said sensor means; and a digital to analog converter connected between the output of said further digital memory means and a temperature compensating control input of said oscillator.

* * * * *